United States Patent [19]

Keyworth et al.

[11] 4,277,567

[45] Jul. 7, 1981

[54] FLAME-RETARDANT VINYL AROMATIC POLYMER COMPOSITIONS

[75] Inventors: Donald A. Keyworth, Houston, Tex.; David C. Purpi, Woodcliff Lake, N.J.

[73] Assignee: Tenneco Chemicals, Inc., Saddle Brook, N.J.

[21] Appl. No.: 423,561

[22] Filed: Dec. 10, 1973

[51] Int. Cl.$^3$ .................................................. C08K 5/02
[52] U.S. Cl. ............................. 521/56; 260/45.7 R; 521/57; 521/98; 521/907
[58] Field of Search ............... 260/2.5 FP, 45.7 R, 260/654 R, 654 H, 880 R; 106/15 FP; 521/56

[56] References Cited

U.S. PATENT DOCUMENTS

| | | | |
|---|---|---|---|
| 2,267,712 | 12/1941 | Bauer | 260/654 |
| 2,676,927 | 4/1954 | McCurdy et al. | 260/2.5 |
| 2,760,947 | 8/1956 | Werkema et al. | 260/33.8 |
| 3,652,690 | 3/1972 | Ito et al. | 260/652 |
| 3,666,692 | 5/1972 | Paige et al. | 260/2.5 |
| 3,677,942 | 7/1972 | Feiner et al. | 252/8.1 |

OTHER PUBLICATIONS

Lespieau et al., Chem. Abs., vol. 19, 1925, 2472.

*Primary Examiner*—Howard E. Schain
*Assistant Examiner*—R. A. White
*Attorney, Agent, or Firm*—Thomas E. Spath

[57] ABSTRACT

Vinyl aromatic polymer compositions contain a flame-retarding amount of 1,1,2,3,4,4-hexabromobutene-2.

13 Claims, No Drawings

FLAME-RETARDANT VINYL AROMATIC POLYMER COMPOSITIONS

This invention relates to flame-retardant vinyl aromatic polymer compositions. More particularly, it relates to vinyl aromatic polymer compositions that contain a flame-retarding amount of 1,1,2,3,4,4-hexabromobutene-2.

Vinyl aromatic polymers are widely used in the preparation of a broad range of consumer and industrial articles. As normally prepared, these polymers will ignite and continue to burn on exposure to flames or high temperatures. In those instances where they are to be used in building interiors or in applications requiring their prolonged exposure to high temperatures, it is necessary that the polymers display flame-retardant properties so that they can meet the standards set by building codes or so that they can be used safely in place of more costly materials. In the past, a number of halogenated organic compounds have been suggested as flame-retardants for vinyl aromatic polymers, but none has proven to be entirely satisfactory in this application. While many of the halogenated compounds are effective in improving the flame-retardance of the polymers, they usually have an adverse effect on the properties of the polymers when they are used in amounts sufficient to impart the desired degree of flame-retardance. In addition, many of the halogenated compounds are volatile or unstable, and polymer compositions containing them lose their flame resistance with the passage of time. A number of brominated compounds have been found to be unsatisfactory becuase they have a plasticizing effect on vinyl aromatic polymers and yield molded articles having insufficient compressive strength and volume stability.

In accordance with this invention, it has been found that 1,1,2,3,4,4-hexabromobutene-2 is a very effective flame-retarding agent for vinyl aromatic polymers.

1,1,2,3,4,4-Hexabromobutene-2, which has the structural formula

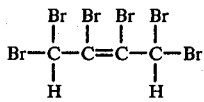

has a combination of properties that makes it particularly valuable as a flame retardant for vinyl aromatic polymers. It is a crystalline compound that melts at about 180° C. and that contains 90 percent by weight of bromine. Because of its solid form, it is very well suited for use in foams and other compositions in which the plasticizer activity frequently contributed by liquid halogenated organic compounds is undesirable because it has a deleterious effect on the physical and mechanical properties of the products. Because it is non-volatile and insoluble in water and most common organic solvents, hexabromobutene-2 cannot be separated from the polymer compositions by leaching, washing, or evaporation. In addition, hexabromobutene-2 is non-toxic, non-irritating, and biodegradable.

1,1,2,3,4,4-Hexabromobutene-2 is commercially available as a mixture that contains about 85 to 95 percent of the trans isomer and 5 to 15 percent of the cis isomer. The trans isomer is insoluble in water and in most organic solvents; the cis isomer is moderately soluble in acetone and certain other organic solvents. While the cis and trans isomers can be separated and used individually as the flame-retardant in vinyl aromatic polymer compositions, it is preferred for reasons of economy and performance that a mixture of isomers that contains about 90 percent of the trans isomer and 10 percent of the cis isomer be used as the flame-retardant in these compositions.

1,1,2,3,4,4-Hexabromobutene-2 can be prepared easily and in good yield by the bromination of diacetylene. This reaction can be conveniently and safely carried out by contacting a gas stream that contains about 20 to 50 mole percent of diacetylene in an inert gas, such as nitrogen, with a dilute solution of bromine in water, carbon tetrachloride, or another inert solvent. The product of this reaction is a mixture of polybrominated compounds that contains about 75 to 80 percent by weight of 1,1,2,3,4,4-hexabromobutene-2, 15 to 23 percent by weight of 1,1,2,4-tetrabromobutene-2, and small amounts of dibromobutadienes. The crystalline hexabromobutene-2 may be separated from the product mixture by filtration. Hexabromobutene-2 prepared in this way contains 85 to 95 percent of the trans isomer and 5 to 15 percent of the cis isomer, and usually about 90 percent of the trans isomer and 10 percent of the cis isomer. This isomer mixture can be used without further treatment as the flame-retardant in vinyl aromatic polymercompositions.

The flame-retardant compositions of this invention may be prepared by incorporating a flame-retarding amount of 1,1,2,3,4,4-hexabromobutene-2 in solid vinyl aromatic polymer compositions that are normally susceptible to burning.

As used herein, the term "vinyl aromatic polymers" includes a wide variety of homopolymers and copolymers of styrene and substituted styrenes. Illustrative of the vinyl aromatic polymers are homopolymers of styrene, vinyltoluene, vinylxylene, ethylvinylbenzene, 4-chlorostyrene, 2,4-dichlorostyrene, isopropylstyrene, tert.butylstyrene, and the like. The copolymers contain a major amount of styrene or one of the aforementioned substituted styrenes and a minor amount of one or more unsaturated comonomers which are copolymerizable therewith, for example, acrylic monomers such as methyl acrylate, ethyl acrylate, butyl acrylate, methyl methacrylate, ethyl methacrylate, butyl methacrylate, acrylic acid, methacrylic acid, and acrylonitrile; vinyl chloride; vinyl acetate; vinyl carbazole; vinylpyridine; diene monomers such as butadiene and isoprene; and maleic acid, fumaric acid, itaconic acid, and their esters with alkanols having 1 to 4 carbon atoms. The flame-retardant of this invention is of particular value in compositions that contain polystyrene, styrene/acrylonitrile copolymers, styrene/methyl methacrylate copolymers, and acrylonitrile/butadiene/styrene terpolymers.

While it is effective in both foamed and non-foamed compositions, hexabromobutene-2 has been found to be particularly effective in polymer foams derived from polystyrene and other vinyl aromatic polymers.

The flame-retardant can be incorporated in the compositions by any convenient procedure. For example, it can be mixed with the polymer in a mill or extruder, or it can be applied to the surface of a shaped resinous article. Alternatively, it can be used to coat particles of the polymer prior to molding, or it can be added to the vinyl aromatic compound before it is polymerized. It is generally preferred that finely-ground hexabromobutene-2 be added to the polymer and other components of the composition prior to the final molding step.

The amount of 1,1,2,3,4,4-hexabromobutene-2 that is incorporated into the vinyl aromatic polymer compositions is that which will impart the desired degree of flame retardance to the compositions without adversely affecting their physical and mechanical properties. The addition of as little as 0.20 percent of hexabromobutene-2, based on the weight of the vinyl aromatic polymer composition, results in a significantly reduced burn rate. Because it does not function as a plasticizer, 50 percent or more of hexabromobutene-2, based on the weight of the composition, can be used to achieve maximum flame retardance without harming the properties of the compositions. It is generally preferred that 0.6 percent to 10 percent of hexabromobutene-2, based on the weight of the composition, be used in foamed vinyl aromatic polymer compositions and that 10 percent to 25 percent of hexabromobutene-2, based on the weight of the composition, be used in non-foamed vinyl aromatic polymer compositions. If desired, a synergist, such as antimony oxide, can be used in combination with the hexabromobutene-2 in the compositions of this invention.

In addition to the vinyl aromatic polymer and hexabromobutene-2, the compositions of this invention may contain fillers, pigments, dyes, stabilizers, other flame retardants, and other additives in the amounts ordinarily used for these purposes.

The invention is further illustrated by the following examples.

EXAMPLE 1

1,1,2,3,4,4-Hexabromobutene-2 was evaluated as a flame-retardant in non-foamed vinyl aromatic polymer compositions by the following procedure:

The appropriate amount of finely-divided hexabromobutene-2 was mixed with 100 parts by weight of a commercial styrene polymer. The resulting mixtures were extruded at 170°–175° C. into 0.125 inch rigid wire using a mixing extruder. The wires were cut into 6 inch lengths, and these specimens were tested for flammability by determining their Limiting Oxygen Index values according to the procedure described in ASTM D-2863. Specimens extruded from the same resins without a flame-retardant additive served as the controls.

The polymers used, the amounts of flame-retardant added, and the results obtained are summarized in the following table.

| Polymer | Level of Hexabromo-butene-2 (PHR) | Limiting Oxygen Index |
|---|---|---|
| Polystyrene | 25 | 27.5 |
| (Styron Q 4347.1) | 10 | 23.1 |
|  | 0 | 17.7 |
| Acrylonitrile/ | 25 | 23.3 |
| butadiene/styrene | 10 | 21.0 |
| terpolymer |  |  |
| (Cycolac T) | 0 | 18.1 |

EXAMPLE 2

1,1,2,3,4,4-Hexabromobutene-2 was evaluated as a flame-retardant in foamed polystyrene by the following procedure:

The appropriate amount of finely-divided hexabromobutene-2 was mixed with 200 parts of expandable polystyrene granules until the granules were evenly coated with hexabromobutene-2. The coated granules were extruded into strands having a diameter of 0.025 inch, and the strands were cut into pellets 0.1 inch long. The pellets were expanded in steam to give approximately spherical granules 0.08 inch in diameter and then placed in steam-heated molds and expanded to produce test blocks having a density of from 1 to 2 pounds per cubic foot. The blocks were cut into specimens, and the specimens were evaluated by standard test procedures. The specimens that contained 0.6 percent or more of hexabromobutene-2, based on the weight of the composition, were found to have good self-extinguishing properties.

Flame-retardance can be imparted to each of the other vinyl aromatic polymers disclosed herein by incorporating in the polymer composition a flame-retarding amount of 1,1,2,3,4,4-hexabromobutene-2.

What is claimed is:

1. A flame-retardant resinous composition comprising a vinyl aromatic polymer and a flame-retarding amount of 1,1,2,3,4,4-hexabromobutene-2.

2. A flame-retardant resinous composition as set forth in claim 1 wherein the vinyl aromatic polymer is polystyrene.

3. A flame-retardant resinous composition as set forth in claim 1 wherein the vinyl aromatic polymer is a copolymer of styrene with a copolymerizable monomer selected from the group consisting of acrylic acid, methacrylic acid, and their esters with alkanols having 1 to 4 carbon atoms; acrylonitrile; vinyl chloride; vinyl carbazole; vinylpyridine; vinyl acetate; maleic acid, fumaric acid, itaconic acid, and their esters with alkanols having 1 to 4 carbon atoms; butadiene; isoprene; and mixtures thereof.

4. A flame-retardant resinous composition as set forth in claim 3 wherein the vinyl aromatic polymer is an acrylonitrile/butadiene/styrene terpolymer.

5. A flame-retardant resinous composition as set forth in claim 1 that contains 0.20 percent to 50 percent, based on the weight of the composition, of 1,1,2,3,4,4-hexabromobutene-2.

6. A flame-retardant resinous composition as set forth in claim 1 wherein the composition is in the form of a foamed article.

7. A flame-retardant resinous composition as set forth in claim 6 that contains 0.6 percent to 10 percent, based on the weight of the composition, of 1,1,2,3,4,4-hexabromobutene-2.

8. A flame-retardant resinous composition as set forth in claim 1 wherein the composition is in the form of a non-foamed article.

9. A flame-retardant resinous composition as set forth in claim 8 that contains 10 percent to 25 percent, based on the weight of the composition, of 1,1,2,3,4,4-hexabromobutene-2.

10. A flame-retardant resinous composition as set forth in claim 1 wherein the 1,1,2,3,4,4-hexabromobutene-2 is a mixture of isomers containing about 90 percent of the trans isomer and 10 percent of the cis isomer.

11. A self-extinguishing, expandable styrene polymer composition comprising a styrene polymer and 0.2 to 50 percent by weight of hexabromo-2-butene.

12. The composition of claim 11 wherein the hexabromo-2-butene is predominantly trans-1,1,2,3,4,4-hexabromo-2-butene.

13. Self-extinguishing, foamed articles prepared by molding the composition of claim 11.

* * * * *